(12) United States Patent
Dörries et al.

(10) Patent No.: US 11,851,633 B2
(45) Date of Patent: *Dec. 26, 2023

(54) CLEANING COMPOSITION

(71) Applicant: ECOLAB USA INC., Saint Paul, MN (US)

(72) Inventors: Stephan Dörries, Düsseldorf (DE); Matthias Schmitz, Düsseldorf (DE); Ralf Krack, Hilden (DE); Michael Schmidt, Mönchengladbach (DE)

(73) Assignee: ECOLAB USA INC., Saint Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/450,323

(22) Filed: Oct. 8, 2021

(65) Prior Publication Data

US 2022/0025296 A1    Jan. 27, 2022

Related U.S. Application Data

(63) Continuation of application No. 16/491,985, filed as application No. PCT/IB2018/051665 on Mar. 13, 2018, now Pat. No. 11,168,285.

(30) Foreign Application Priority Data

Mar. 15, 2017 (GB) .................................. 17041278

(51) Int. Cl.
*C11D 1/83* (2006.01)
*B01D 65/02* (2006.01)
(Continued)

(52) U.S. Cl.
CPC ................ *C11D 1/83* (2013.01); *B01D 65/02* (2013.01); *B08B 3/08* (2013.01); *C11D 11/0023* (2013.01);
(Continued)

(58) Field of Classification Search
CPC ............................ C11D 1/83; C11D 11/0023
See application file for complete search history.

(56) References Cited

U.S. PATENT DOCUMENTS

| 4,661,275 A | 4/1987 | Forsberg et al. |
| 5,213,619 A | 5/1993 | Jackson et al. |

(Continued)

FOREIGN PATENT DOCUMENTS

| EP | 2987849 A1 | 2/2016 |
| JP | 2003277796 A | 10/2003 |

(Continued)

OTHER PUBLICATIONS

Ecolab USA Inc., "International Search Report", in connection with PCT/IB2018/051665 filed Mar. 13, 2018, 10 pages, dated May 25, 2018.

*Primary Examiner* — Liam J Heincer
*Assistant Examiner* — M. Reza Asdjodi
(74) *Attorney, Agent, or Firm* — McKee, Voorhees & Sease, PLC

(57) ABSTRACT

A composition for cleaning membranes used in food processing comprising an amine oxide and an alkyl sulfate, the composition maintaining good cleaning performance whilst leaving a low residue of surfactant on the membrane that is cleaned using the composition. A method of use of the composition is also presented.

14 Claims, 1 Drawing Sheet

(51) Int. Cl.
  *C11D 11/00* (2006.01)
  *B08B 3/08* (2006.01)
  *C11D 1/14* (2006.01)
  *C11D 1/75* (2006.01)

(52) U.S. Cl.
  CPC .. *B01D 2321/162* (2013.01); *B01D 2321/164* (2013.01); *C11D 1/146* (2013.01); *C11D 1/75* (2013.01)

(56) References Cited

U.S. PATENT DOCUMENTS

| | | | |
|---|---|---|---|
| 5,678,238 A | 10/1997 | Billings et al. | |
| 6,022,840 A | 2/2000 | Weibel | |
| 6,036,789 A | 3/2000 | Weibel | |
| 2002/0019325 A1* | 2/2002 | Olsen | C11D 11/0017 510/392 |
| 2004/0014624 A1* | 1/2004 | Bolkan | C11D 1/722 510/297 |
| 2006/0241005 A1* | 10/2006 | Siebert | C11D 1/94 510/245 |
| 2009/0200234 A1* | 8/2009 | Schacht | C11D 3/3932 210/636 |
| 2011/0312870 A1 | 12/2011 | Beatty | |
| 2014/0030425 A1 | 1/2014 | Owei et al. | |
| 2014/0194337 A1 | 7/2014 | Beatty | |
| 2015/0343386 A1* | 12/2015 | Labib | C11D 3/48 210/636 |
| 2017/0051234 A1* | 2/2017 | Foster | C11D 3/3418 |
| 2018/0134997 A1* | 5/2018 | Gebert | C11D 17/0039 |
| 2018/0200678 A1* | 7/2018 | Ishii | C02F 5/12 |
| 2019/0119606 A1* | 4/2019 | Bauer | C11D 11/0041 |
| 2020/0308506 A1* | 10/2020 | Dörries | C11D 1/83 |
| 2022/0025296 A1* | 1/2022 | Dörries | C11D 11/0023 |

FOREIGN PATENT DOCUMENTS

| | | | | |
|---|---|---|---|---|
| JP | 2005281651 A | * | 10/2005 | |
| JP | 2005281651 A | | 10/2005 | |
| JP | 2012106160 A | * | 6/2012 | |
| JP | 2012106160 A | | 6/2012 | |
| WO | 2016112984 A1 | | 7/2016 | |
| WO | WO-2016112984 A1 | * | 7/2016 | ............ C11D 1/06 |
| WO | 2017017995 A1 | | 2/2017 | |

\* cited by examiner

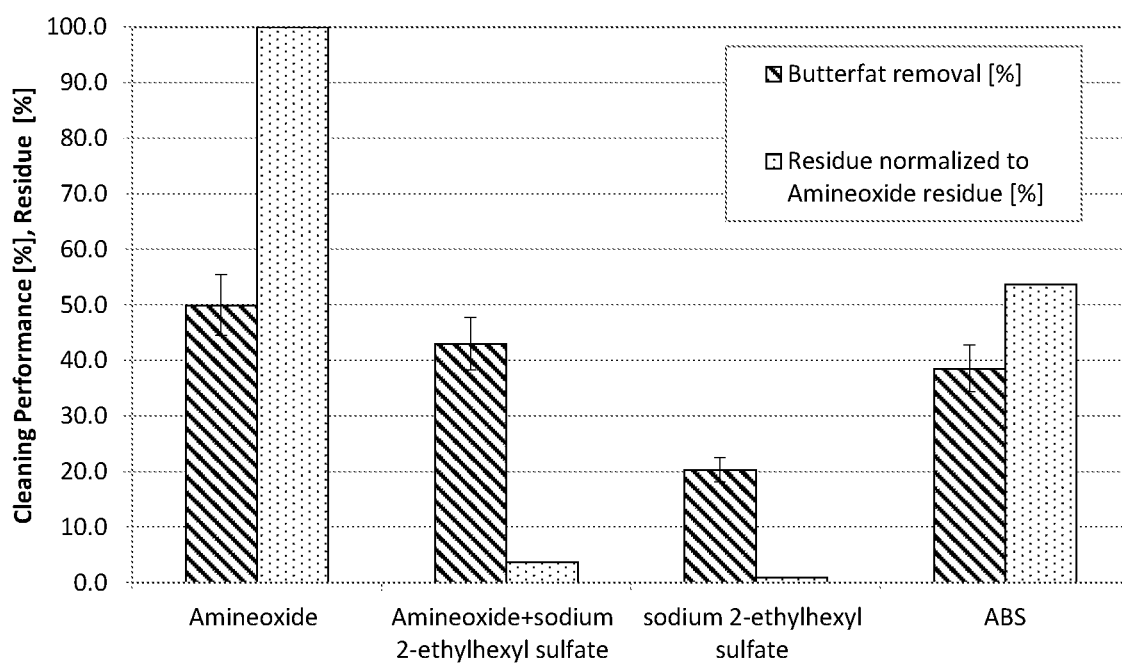

CLEANING COMPOSITION

CROSS REFERENCE TO RELATED APPLICATIONS

This is a Continuation Application of U.S. Ser. No. 16/491,985, filed Sep. 6, 2019, which is a U.S. National Phase application claiming priority to PCT/IB2018/051665, filed Mar. 13, 2018, which claims priority to British application No. 1704127.8, filed Mar. 15, 2017, the entire contents of which are hereby incorporated by reference in their entirety.

FIELD OF THE INVENTION

The invention relates to cleaning compositions, more specifically to compositions for cleaning membranes used in processing food products.

BACKGROUND OF THE INVENTION

In the food and beverage industry, it is important that the food and beverage products produced are of a suitable standard and purity for consumption by the public. The public will not accept products that contain chemical residues, such as those that remain after cleaning of the equipment used to produce a particular product. For example, it is not acceptable for food products to taste of the surfactants that were used to clean the equipment used to produce the product.

Customer product quality is an increasingly important topic for high premium whey products such as infant food, for example, where it is critical that the products are not contaminated with or contain potentially hazardous materials. It is currently possible to analyse products to detect such residues in parts per million (ppm) or parts per billion (ppb) scale to ensure that even trace amounts of undesirable or hazardous materials are not present in dairy products in particular.

The need for minimising residue in food products must be balanced with the need to ensure thorough cleaning of the equipment. Where dairy products are processed through a membrane filter, the filtration processes are contingent on a consistent throughput of the dairy product across the membrane. Therefore, it is important that an effective and carefully chosen cleaning composition and cleaning regime is used to maximize membrane life and minimize premature replacement. Proper cleaning procedures directly affect productivity and production costs.

Currently, equipment that is used to produce high quality food products, such as membrane filters, are rinsed thoroughly to remove cleaning products. However, procedures required to remove cleaning compositions typically are lengthy and therefore, require considerable down time of the equipment between production runs.

Accordingly, it is one object of the invention to provide an improved cleaning composition that is used for cleaning membranes used to process food and beverage products.

SUMMARY OF THE INVENTION

According to a first aspect of the invention there is provided a composition for use as a cleaning composition to clean membranes, the composition comprising at least one amine oxide and at least one alkyl sulfate, wherein less than 50 mg/m$^2$ of the composition is retained on a membrane cleaned using the composition.

The person skilled in the art will understand that the at least one amine oxide and the at least one alkyl sulfate are both surfactants. Accordingly, the composition of the invention comprises at least two different surfactants, a non-ionic surfactant and an anionic surfactant.

The cleaning composition may be used to clean membranes used to process food products or beverages. For example, the cleaning composition may be used to clean membranes used to process dairy products, fruit juices or alcoholic beverages such as beer.

Typically, the membrane that is cleaned using the composition of the present aspect is rinsed using water after the application of the composition.

Cleaning compositions used to clean membranes that are used to process food products typically leave a residue on the membranes, even after rinsing. This residue can then pass into the food products that are subsequently processed by the membrane. For example, residue on membranes used to process beer or wine can be re-dissolved by the alcohol in the beverage. In another example, residue on membranes used to process dairy products can be re-dissolved in the fats present in the diary dairy product. Accordingly, the cleaning composition can contaminate the product that is to be processed using the membrane.

The use of a cleaning composition to clean membranes used in food product processing that leaves less than 50 mg/m$^2$ of surfactant on the membrane according to the present invention requires significantly less rinsing of the membrane to remove, for example, and is a sufficiently low concentration to pose a reduced risk of contamination of dairy products subsequently processed by the membrane compared to uses of compositions known in the art to clean dairy product membranes.

It has been found by the inventors that the use of conventional cleaning products leaves a significant residue of the surfactants within the cleaning products which must be rinsed from the membrane before the membrane is used again, and in some instances, surfactant remains on the membrane even after extensive rinsing. In addition, surfactants that leave a low residue on the membrane after use typically have a reduced cleaning performance.

The adsorption and subsequent desorption of a surfactant to a surface depends on a variety of different factors. The material of the surface, and more specifically the hydrophilicity of the surface, would be expected to influence the adsorption behaviour of a surfactant onto a substrate. The macroscopic structure of the material might also be expected to impact the adsorption and desorption of a surfactant to a surface, therefore the amount of surfactant that remains on the surface after use. For example, results of a flat and even material compared to a porous membrane could be expected to give different results. The pore size of a porous material such as a membrane may also be expected to produce different results, e.g. microfiltration membrane compared to ultrafiltration membrane. The different molecular weight cut off of the membranes may lead to different interaction of the membrane with the different-sized and structured surfactants. Accordingly, different sized pores on the same material membrane could lead to different residue result for a given surfactant.

Furthermore, for a given surface, the structure of a surfactant would also be expected to influence the adsorption and desorption to and from a surface. Chain length, size of surfactant, and the electronegativity of the polar head groups may all influence the adsorption and desorption behaviour of the surfactant to a given surface and therefore to a given membrane.

It has been surprisingly found by the inventors that a cleaning composition comprising both at least one amine oxide and at least one alkyl sulfate provides both good cleaning performance of the membrane and a low residue on the membrane after the cleaning process. Accordingly, use of the composition of the present invention allows a high quality clean of the membrane without requiring extensive rinses with water after the cleaning process, resulting in reduced cleaning procedures and lower risks of contamination of the products.

Typically, less than 20 mg/m$^2$ of the surfactants of the composition are retained on the membrane after use. Preferably, less than 10 mg/m$^2$ of the surfactants of the composition are retained on the membrane after use. More preferably, less than 5 mg/m$^2$ of the surfactants of the composition are retained on the membrane after use.

In some embodiments, the retained composition of the present aspect on a membrane may be 50% less than compositions comprising an amine oxide that do not comprise an alkyl sulfate. The retained composition of the present aspect on a membrane may be 75% less than compositions comprising an amine oxide that do not comprise an alkyl sulfate. The retained composition of the present aspect on a membrane may be 90% less than compositions comprising an amine oxide that do not comprise an alkyl sulfate.

It will be readily understood by the person skilled in the art that the term, "amine oxide" refers to oxides of tertiary amines having general formula (I):

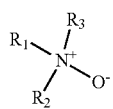

(I)

wherein $R_1$ is selected independently from optionally substituted $C_4$-$C_{20}$ alkyl, $R_2$ and $R_3$ are selected independently from optionally substituted $C_1$-$C_5$ alkyl.

Suitable substituents are defined below.

The composition may comprise a plurality of amine oxides. Each amine oxide within the plurality of amine oxides may vary in chain length for one or more of $R_1$, $R_2$, or $R_3$. For example, the composition may comprise a plurality of amine oxides comprising at least three amine oxides where $R_1$ is $C_{12}$ alkyl for a first amine oxide, $R_1$ is $C_{14}$ alkyl for a second amine oxide and $R_1$ is $C_{16}$ alkyl for a third amine oxide.

For example, the amine oxide may be selected from the list comprising: tetradecyldimethylamine oxide, lauryldimethylamine oxide, pentadecyldimethylamine oxide, decyldimethylamine oxide, hexadecyldimethylamine oxide, octadecyldimethylamine oxide, or cocalkyldimethylamine oxide.

Typically, $R_1$ is $C_{12}$-$C_{16}$ alkyl. Preferably, $R_2$ and $R_3$ are $C_{1-3}$ alkyl.

Preferably, the at least one amine oxide includes lauryldimethylamine oxide.

The composition may comprise from 10 to 2000 ppm of the at least one amine oxide. The composition may comprise from 10 to 1000 ppm of the at least one amine oxide. The composition may comprise from 10 to 500 ppm of the at least one amine oxide. The composition may comprise from 50 to 400 ppm of the at least one amine oxide. The composition may comprise from 100 to 400 ppm of the at least one amine oxide.

The composition may comprise at least 50 ppm of the at least one amine oxide. The composition may comprise at least 100 ppm of the at least one amine oxide. The composition may comprise at least 150 ppm of the at least one amine oxide.

The composition may be provided in a concentrated stock solution that is then diluted by the end user for use. Accordingly, the stock solution may comprise 1 to 40 weight percent of the at least one amine oxide. The stock solution may comprise 1 to 20 weight percent of the at least one amine oxide. The stock solution may be diluted before use such that the composition that is used to clean the membrane may comprise from 0.01 to 2 weight percent of the at least one amine oxide, or from 0.01 to 1 weight percent of the at least one amine oxide, for example.

Typically, the at least one alkyl sulfate has the general formula (II):

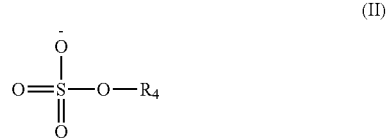

(II)

where $R_4$ is selected from the group consisting of optionally substituted $C_4$-$C_{20}$ alkyl, and optionally substituted $C_4$-$C_{20}$ cycloalkyl.

The at least one alkyl sulfate may be a linear alkyl sulfate. Accordingly, $R_4$ may be linear. The at least one alkyl sulfate may be a branched alkyl sulfate. Accordingly, $R_4$ may be branched.

In some embodiments, $R_4$ may be optionally substituted $C_6$-$C_{15}$ alkyl. $R_4$ may be optionally substituted $C_6$ to $C_{10}$ alkyl.

Preferably, the at least one alkyl sulfate comprises 2-ethylhexyl sulfate.

The composition may comprise from 10 to 1000 ppm of the at least one alkyl sulfate. The composition may comprise from 10 to 500 ppm of the at least one alkyl sulfate. The composition may comprise from 10 to 300 ppm of the at least one alkyl sulfate. The composition may comprise from 50 to 200 ppm of the at least one alkyl sulfate. The composition may comprise from 50 to 100 ppm of the at least one alkyl sulfate.

The composition may comprise at least 50 ppm of the at least one alkyl sulfate. The composition may comprise at least 75 ppm of the at least one alkyl sulfate.

In some embodiments, the composition may be provided in a concentrated stock solution that is then diluted by the end user before use. Accordingly, the stock solution may comprise 1 to 40 weight percent of the at least one alkyl sulfate. The stock solution may comprise 1 to 20 weight percent of the at least one alkyl sulfate. The stock solution may then be diluted before use such that the composition that is used to clean the membrane may comprise from 0.001 to 2 weight percent of the at least one alkyl sulfate or from 0.05 to 1 weight percent of the at least one alkyl sulfate, for example.

The at least one alkyl sulfate is preferably in salt form. Typically the counter ion of the salt form of the at least one alkyl sulfate is a monovalent counter ion. The counter ion may be an alkali metal, such as sodium, or potassium. The counter ion may be any other suitable counter ion, such as ammonium, for example.

Most preferably, the composition comprises lauryldimethylamine oxide and 2-ethylhexyl sulfate. The composition may comprise from 100 ppm to 1000 ppm lauryldimethylamine oxide and the composition may comprise from 50 ppm to 500 ppm 2-ethylhexyl sulfate. The composition may comprise from 100 ppm to 500 ppm lauryldimethylamine oxide and the composition may comprise from 50 ppm to 250 ppm 2-ethylhexyl sulfate. The composition may comprise from 100 to 400 ppm lauryldimethylamine oxide and the composition may comprise from 50 to 100 ppm 2-ethylhexyl sulfate.

The composition may comprise additional components. The composition may comprise a salt. For example, the composition may comprise an alkali metal salt, such as an alkali metal halide, or sulfate; or an alkali earth metal, such as an alkali earth metal halide or sulfate.

The composition may comprise enzymes such as proteases, lipases, or proteolytic enzymes.

The composition may comprise stabilisers such as polypropylene glycol, glycerin, glycerol, polyols, sorbitols, or sugar alcohols for example.

The composition may be acidic. For example, the composition may have a pH of less than pH 5, less than pH 4, less than pH 3. The composition may have a pH between 0 and 5, 0 and 4, or 0 and 3. The composition may have a pH between 1 and 5, 1 and 4, or 1 and 3.

The composition may be alkaline. For example, the composition may have a pH of more than pH 8, more than pH 9, or more than pH 10. The composition may have a pH from 8 to 14, 9 to 14, or 10 to 14. The composition may have a pH from 8 to 12, 9 to 12, or 10 to 12.

The composition may be neutral. For example, the composition may have a pH from 6 to 8, such as pH 6, pH 6.5, pH 7, pH 7.5 or pH 8.

The composition may be neutral and the pH may be changed before application to a membrane to be cleaned. For example, the pH may be raised prior to application to a membrane to be cleaned. Alternatively, the pH may be lowered prior to application to a membrane to be cleaned.

Typically, the membrane cleaned using the composition is a polymeric membrane. For example, the membrane may comprise polyamide, polyether sulfone, polysulfone, polyvinyldifluoride, polypropylene, or polyacrylnitrile.

In alternative embodiments, the membrane that is cleaned using the composition may be a ceramic membrane.

The membrane may comprise a backing layer. The backing layer may be a polymeric backing layer. For example, the backing layer may comprise polyethylene or polypropylene.

Chemical Groups

Halo

The term "halogen" (or "halo") includes fluorine, chlorine, bromine, and iodine.

Alkyl, Alkylene, Alkenyl, Alkynyl, Cycloalkyl Etc.

The terms "alkyl", "alkylene", "alkenyl", or "alkynyl" are used herein to refer to both straight and branched chain acyclic forms. Cyclic analogues thereof are referred to as cycloalkyl, etc.

The term "alkyl" includes monovalent, straight or branched, saturated, acyclic hydrocarbyl groups. In one embodiment alkyl is $C_{1-10}$alkyl, in another embodiment $C_{1-6}$alkyl, in another embodiment $C_{1-4}$alkyl, such as methyl, ethyl, n-propyl, i-propyl, or t-butyl groups.

The term "cycloalkyl." includes monovalent, saturated, cyclic hydrocarbyl groups. In some embodiments the cycloalkyl is $C_{1-10}$cycloalkyl, in other embodiments $C_{3-6}$cycloalkyl, such as cyclopentyl and cyclohexyl.

Substituents

Optionally substituted groups of the compounds of the invention may be substituted or unsubstituted, in one embodiment unsubstituted. Typically, substitution involves the notional replacement of a hydrogen atom with a substituent group, or two hydrogen atoms in the case of substitution by =O.

Where substituted, there will generally be 1 to 3 substituents unless otherwise stated herein, in one embodiment 1 or 2 substituents, for example, 1 substituent.

The optional substituent(s) may be selected independently from the groups consisting of halogen, trihalomethyl, trihaloethyl, OH, $NH_2$, $-NO_2$, $-CN$, $-N^+(C_{1-6}alkyl)_2O^-$, $-CO_2H$, $-CO_2C_{1-6}alkyl$, $-SO_3H$, $-SOC_{1-6}alkyl$, $-SO_2C_{1-6}alkyl$, $-SO_3C_{1-6}alkyl$, $-OC(=O)OC_{1-6}alkyl$, $-C(=O)H$, $-C(=O)C_{1-6}alkyl$, $-OC(=O)C_{1-6}alkyl$, =O, $-N(C_{1-6}alkyl)_2$, $-C(=O)NH_2$, $-C(=O)N(C_{1-6}alkyl)_2$, $-N(C_{1-6}alkyl)C(=O)O(C_{1-6}alkyl)$, $-N(C_{1-6}alkyl)C(=O)N(C_{1-6}alkyl)_2$, $-OC(=O)N(C_{1-6}alkyl)_2$, $-N(C_{1-6}alkyl)C(=O)C_{1-6}alkyl$, $-C(=S)N(C_{1-6}alkyl)_2$, $-N(C_{1-6}alkyl)C(=S)C_{1-6}alkyl$, $-SO_2N(C_{1-6}alkyl)_2$, $-N(C_{1-6}alkyl)SO_2C_{1-6}alkyl$, $-N(C_{1-6}alkyl)C(=S)N(C_{1-6}alkyl)_2$, $-N(C_{1-6})SO_2N(C_{1-6}alkyl)_2$, $-C_{1-6}alkyl$, $-C_{1-6}heteroalkyl$, $-C_{3-6}cycloalkyl$, $-C_{3-6}heterocycloalkyl$, $-C_{2-6}alkenyl$, $-C_{2-6}heteroalkenyl$, $-C_{3-6}cycloalkenyl$, $-C_{3-6}heterocycloalkenyl$, $-C_{2-6}alkynyl$, $-C_{2-6}heteroalkynyl$, $-Z^u-C_{1-6}alkyl$, $-Z^u-C_{1-6}cycloalkyl$, $-Z^u-C_{2-6}alkenyl$, $-Z^u-C_{3-6}cycloalkenyl$, and $-Z^u-C_{2-6}alkynyl$, wherein $Z^u$ is independently O, S, NH, or $N(C_{1-6}alkyl)$.

In another embodiment, the optional substituent(s) is/are independently OH, $NH_2$, halogen, trihalomethyl, trihaloethyl, $-NO_2$, $-CN$, $-N^+(C_{1-6}alkyl)_2O^-$, $-CO_2H$, $-SO_3H$, $-SOC_{1-6}alkyl$, $-SO_2C_{1-6}alkyl$, $-C(=O)H$, $-C(=O)C_{1-6}alkyl$, =O, $-N(C_{1-6}alkyl)_2$, $-C(=O)NH_2$, $-C_{1-6}alkyl$, $-C_{3-6}cycloalkyl$, $-C_{3-6}heterocycloalkyl$, $-Z^uC_{1-6}alkyl$, or $-Z^u-C_{3-6}cycloalkyl$, wherein $Z^u$ is defined above.

In another embodiment, the optional substituent(s) is/are independently OH, $NH_2$, halogen, trihalomethyl, $-NO_2$, $-CN$, $-CO_2H$, $-C(=O)C_{1-6}alkyd$, =O, $-N(C_{1-6}alkyl)_2$, $-C(=O)NH_2$, $-C_{1-6}alkyl$, $-C_{3-6}cycloalkyl$, $-C_{3-6}heterocycloalkyl$, $-Z^uC_{1-6}alkyl$ or $-Z^u-C_{3-6}cycloalkyl$, wherein $Z^u$ is defined above.

In another embodiment, the optional substituent(s) is/are independently halogen, OH, $NH_2$, $-NO_2$, $-CN$, $-CO_2H$, =O, $-N(C_{1-6}alkyl)_2$, $-C_{1-6}alkyl$, $-C_{3-6}cycloalkyl$, or $-C_{3-6}heterocycloalkyl$.

In another embodiment, the optional substituent(s) is/are independently halogen, OH, $NH_2$, =O, $-C_{1-6}alkyl$, $-C_{3-6}cycloalkyl$, or $-C_{3-6}heterocycloalkyl$.

According to a second aspect of the invention there is provided a method of cleaning a membrane comprising the steps:

a) providing a cleaning composition according to the first aspect;
b) applying the composition to a membrane; and
c) rinsing the membrane to remove the majority of the composition from the membrane;

wherein the membrane comprises less than 50 mg/m² of the cleaning composition after the step of rinsing the membrane.

Preferably, the membrane is rinsed with water. The membrane may be rinsed with water of high, medium, or low quality.

The membrane may comprise less than 20 mg/m² of the surfactant after the step of rinsing the membrane. Preferably, the membrane comprises less than 10 mg/m² of the surfactant after the step of rinsing the membrane. More preferably, the membrane comprises less than 5 mg/m$^2$ of the surfactant after the step of rinsing the membrane. Accordingly, step (c) may remove substantially all of the surfactants of the composition from the membrane. Step (c) may remove substantially all of the composition from the membrane.

In some embodiments, the membrane may retain 50% less amine oxide than compositions comprising an amine oxide that do not comprise an alkyl sulfate. The membrane may retain 75% less amine oxide than compositions comprising an amine oxide that do not comprise an alkyl sulfate. The membrane may retain 90% less amine oxide than compositions comprising an amine oxide that do not comprise an alkyl sulfate.

Typically, step (c) requires a lower volume of water to remove the cleaning composition from the membrane than methods using cleaning compositions known in the art. As a result, the down time between production runs where the cleaning composition of the invention is used to clean the membranes is reduced.

The method of the present aspect may be applied to clean membranes that are used to process food or beverage products. Accordingly, the method may be applied to clean membranes used to process beer. Alternatively, the method may be applied to clean membranes used to process dairy products. In embodiments where the method is used to clean membranes used to process dairy products, the cleaning composition may be particularly efficacious at removing components of the dairy products from the membrane. For example, the cleaning composition may remove milk proteins and fats such as butterfat from the membrane.

The composition may be acidic. For example, the composition may have a pH of less than pH 5, less than pH 4, or less than pH 3.

The composition may be alkaline. The composition may have a pH of more than pH 8, more than pH 9, or more than pH 10. For example, the composition may have a pH of 10, 11, or 12.

The pH of the composition may be changed before being applied to the membrane using the method of the invention. The pH of the composition may be raised. For example, the pH of the composition may be raised to pH 8, pH 9, pH 10, or higher. The pH of the composition may be lowered. For example, the pH of the composition may be lowered to pH 7, pH 5, pH 4, pH 3, or lower.

In a third aspect of the invention, the invention extends to use of a composition according to the first aspect of the invention to clean membranes used to process food products.

Preferred and optional features of the first and second aspects are preferred and optional features of the third aspect.

BRIEF DESCRIPTION OF THE FIGURES

Embodiments of the present invention will now be described, by way of non-limiting example, with reference to the accompanying drawings.

FIG. 1 is a chart showing the cleaning performance of test cleaning compositions and surfactant residue remaining on a membrane cleaned using the compositions.

DETAILED DESCRIPTION

While the making and using of various embodiments of the present invention are discussed in detail below, it should be appreciated that the present invention provides many applicable inventive concepts that can be embodied in a wide variety of specific contexts.

The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an", and "the" are not intended to refer to only a singular entity, but include the general class of which a specific example may be used for illustration. The terminology herein is used to describe specific embodiments of the invention, but their usage does not delimit the invention, except as outlined in the claims.

The behaviour of a number of surfactants on a porous structure such as a membrane was tested on common ultrafiltration membranes as follows.

Method

Different types of commercially available polymeric ultrafiltration membranes were tested. Membrane materials: PES: polyether sulfone, PS: polysulfone. Membrane backing material: PE: polyethylene, PP: polypropylene. For example, the HFK 131 membrane has a polyether sulfone membrane with a polyethylene backing material this is indicated in table 1 below as PES/PE.

Pre-Cleaning of Membranes

Membranes were pre-rinsed with deionised water (DI water) at 2 m$^3$/hour for 5 minutes at standard conditions (room temperature and 1 bar pressure). The membranes were then cleaned using citric acid (pH 2.5) for 20 minutes at 40° C., before being rinsed in DI water for 10 minutes. The membranes were further cleaned using sodium hydroxide (NaOH) at pH 11.5 for 20 minutes at 40-45° C.

Before and after each stage of cleaning of the membrane, the pure water flux was determined to monitor the concentration of any contaminants on the membranes Surfactant Screening 1000 ppm active surfactant solution (in DI water) was recirculated at 40-45° C., 2 bars, in alkaline conditions pH 11.5 at a feed flow of 5 m$^3$/h, through 0.15 m$^2$/membrane type for 30 minutes on pre-cleaned and conditioned ultrafiltration membranes (by the process described above).

One surfactant (sodium 2-ethylhexyl sulfate) was tested in both alkaline and acidic conditions (pH 2.5).

Any residue on the membranes was extracted with acetonitrile at 80° C., 100 bars with Accelerated Solvent Extraction (ASE) in two cycles. The resulting solution was analyzed by liquid chromatography to determine the surfactant concentration extracted from the membrane surface.

The membranes were then rinsed in DI water for 10 minutes at 2 m$^3$/hour and 1 bar. Samples were taken every minute from concentrate and total permeate side for surface tension measurements. Again, pure water flux was determined as previously described. The cleaned membranes were then analysed to determine the mass of surfactant residue that remained on the membrane after the above cleaning procedure.

The results of a variety of different commercially available surfactants and surfactant blends tested on membranes with a porous structure are shown below in Table 1.

TABLE 1

Summary of test results showing the residue remaining on test membranes in mg/m². Where blends of surfactants were used, x/y gives the residue of surfactant X and surfactant Y respectively. Concentrations of surfactants are 1000 ppm unless otherwise stated below.

| Membrane | Polymer/Backing | Cleaning composition | | | | | | |
|---|---|---|---|---|---|---|---|---|
| | | A | B | C | D | E | F | G |
| HFK 131 | PES/PE | 950 | 400 | 200 | 4 | 6 | 0.04/10 | 0.04/3 |
| UFX pHT | PS/PP* | 550 | 100 | 60 | 1 | 0.5 | 1/11 | 2/9 |
| GR6 1PP | PS/PP | 850 | 300 | 100 | 1 | 3 | 0.5/14 | 0.2/5 |
| GR70PE | PS/PE | 1750 | 300 | 300 | 2 | 2 | 1/13 | 1/30 |
| UP010 | PES/PE | 1100 | 500 | 200 | 2 | 5 | 1/19 | 1/6 |

A is 2-propylheptanol ethoxylates (10M ethylene oxide).
B is lauryldimethylamine oxide
C is alkylbenzene sulfonate sodium salt ($C_{10}$-$C_{14}$).
D is sodium 2-ethylhexyl sulfate, acidic.
E is sodium 2-ethylhexyl sulfate, alkaline.
F is sodium 2-ethylhexyl sulfate, alkaline 300 ppm + lauryldimethylamine oxide 100 ppm.
G is sodium 2-elhylhexyl sulfate, alkaline 50 ppm + lauryldimethylamine oxide 100 ppm.

As can be seen from the results in Table 1, ABS had a superior residue performance (i.e., a lower mass of surfactant remained on the membrane after cleaning) compared to lauryldimethylamine oxide. On the other hand, 2-propylheptanol ethoxylates lead to a significantly higher surfactant residue than these standard membrane cleaning surfactants (~factor of 2).

The backing materials of the membranes has also been shown to produce different results (compare GR61PP with GR70PE, for example).

Cleaning Performance Versus Surfactant Residue

Whilst a low surfactant residue is important for membrane cleaning compositions, it is also important that the cleaning performance of the cleaning composition is of a high standard.

Accordingly, tests were carried out to determine the cleaning performance of a number of cleaning compositions and compared this result with the surfactant residue that remained on a membrane that was cleaned using those compositions.

The cleaning performance of the test cleaning compositions was determined by measuring the percentage of butterfat removed from a membrane and was carried out using the following method:

PS coupons were prepared by pre-cleaning in methanol for 30 seconds and being allowed to dry. The coupons were then weighed to get the clean coupon weight. A homogenous layer of butter was applied to the coupons and the dried weight recorded.

Surfactant solutions were prepared and heated to 45° C. The surfactant solutions were stirred at 240 rpm and the pH was brought to pH 11 using NaOH. The coupons were suspended in the surfactant solutions for ten minutes, before being rinsed with deionised water and allowed to dry overnight. The coupons were then weighed to record the weight of butter that had been removed by the surfactant solution.

The results are shown in FIG. 1. The surfactant residue on the membrane cleaned using the compositions is shown normalised to the residue of lauryldimethylamine oxide, a common surfactant used in the art to clean membranes.

As can be seen, lauryldimethylamine oxide showed good cleaning performance, removing 50% of the butterfat from the membrane, but there remained a high residue of the surfactant on the membrane after rinsing of the membrane.

In contrast, alkylbenzene sulfonate sodium salt (ABS) showed a reduced cleaning performance and an improved residue performance compared to NPE and the amine oxide composition. The sodium 2-ethylhexyl sulfate composition showed very good residue performance but poor cleaning performance.

Surprisingly, the cleaning composition comprising the combination of the lauryldimethylamine oxide and the sodium 2-ethylhexyl sulfate maintained a similar, if slightly reduced, cleaning performance to the amine oxide alone, whilst also maintaining the good residue performance of the sodium 2-ethylhexyl sulfate composition.

Comparative pure water flux impact studies (data not shown) also showed that lauryldimethylamine oxide had the highest pure water flux impact of standard commercially available surfactants used for membrane cleaning, and surprisingly, the addition of an alkyl sulfate such as sodium 2-ethylhexyl sulfate to the lauryldimethylamine oxide did not have a negative impact of the pure water flux impact of the composition. This is a further demonstration of the surprising retention of the superior cleaning performance of the amine oxide even when combined with alkyl sulfate.

The reduction in residue performance was further studied in relation to the volume of water used to rinse a membrane. Table 2 below shows a comparison of the residue remaining on a membrane, as measured by the surface tension of the rinse water runoff, for lauryldimethylamine oxide (AO) alone and lauryldimethylamine oxide in combination with sodium 2-ethylhexyl sulfate (AS).

TABLE 2

Surface tension of rinse water that has been used to rinse a membrane cleaned using with a cleaning composition comprising lauryldimethylamine oxide (AO) compared to a membrane cleaned using a cleaning composition comprising lauryldimethylamine oxide and sodium 2-ethylhexyl sulfate (AS).

| Rinse Volume [l] | AO Surface tension [N/m] | AO + AS Surface tension [N/m] |
|---|---|---|
| 4000 | 30.1 | 26.2 |
| 8000 | — | 30.8 |
| 12000 | 40.8 | 52.7 |
| 16000 | — | 60.7 |
| 20000 | 52.0 | 61.3 |

As can be seen, the combination composition is removed at a faster rate than the composition comprising the lauryldimethylamine oxide only.

In further studies, it was shown that the cleaning performance of the lauryldimethylamine oxide was largely unaffected by the concentration of sodium 2-ethylhexyl sulfate.

In contrast, other cleaning compositions comprising a blend of surfactants that were tested, such as a composition comprising lauryldimethylamine oxide and oleic acid sulfonate potassium salt, showed that the cleaning performance of the amine oxide decreased proportionally to the concentration of the oleic acid sulfonate potassium salt.

Accordingly, the composition comprising the combination of lauryldimethylamine oxide and sodium 2-ethylhexyl sulfate was found to be surprisingly efficacious for use as a cleaning composition for membranes, especially those membranes used to process food products such as dairy products.

The invention claimed is:

1. A method of cleaning a polymeric membrane comprising:
   applying a composition comprising at least one amine oxide comprising lauryldimethylamine oxide and from about 10 ppm to about 300 ppm of at least one alkyl sulfate to the polymeric membrane, wherein the at least one alkyl sulfate comprises 2-ethylhexyl sulfate; and
   rinsing the polymeric membrane to remove at least a majority of the composition from the polymeric membrane.

2. The method of claim 1, wherein the polymeric membrane comprises less than 50 mg/m$^2$ of the composition after rinsing the polymeric membrane.

3. The method of claim 1, wherein the polymeric membrane comprises less than 20 mg/m$^2$ of the composition after rinsing the polymeric membrane.

4. The method of claim 1, wherein the composition comprises from 10 ppm to 1000 ppm of the at least one amine oxide.

5. The method of claim 1, wherein the composition comprises a plurality of amine oxides.

6. The method of claim 1, wherein the at least one amine oxide comprises lauryldimethylamine oxide, and wherein the at least one alkyl sulfate comprises 2-ethylhexyl sulfate.

7. The method of claim 1, wherein the polymeric membrane is used to process a food product or a beverage.

8. The method of claim 7, wherein the polymeric membrane is used to process a dairy product, a fruit juice, or an alcoholic beverage.

9. The method of claim 1, wherein the polymeric membrane comprises polyamide, polyether sulfone, polysulfone, polyvinyldifluoride, polypropylene, or polyacrylnitrile.

10. The method of claim 1, wherein the polymeric membrane comprises a polyethylene or polypropylene backing layer.

11. The method of claim 1, wherein the composition has a pH of more than 8.

12. The method of claim 1, wherein the composition has a pH of less than pH 5.

13. The method of claim 1, wherein the composition further comprises an enzyme.

14. The method of claim 1, wherein the composition further comprises a stabilizer.

* * * * *

UNITED STATES PATENT AND TRADEMARK OFFICE
CERTIFICATE OF CORRECTION

PATENT NO. : 11,851,633 B2  
APPLICATION NO. : 17/450323  
DATED : December 26, 2023  
INVENTOR(S) : Stephan Dörries et al.

Page 1 of 1

It is certified that error appears in the above-identified patent and that said Letters Patent is hereby corrected as shown below:

In the Claims

Column 12, Claim 9, Line 33:  
DELETE "polyacrylnitrile." after "or"  
INSERT --polyacrylonitrile.-- after "or"

Signed and Sealed this  
Sixteenth Day of July, 2024

Katherine Kelly Vidal  
*Director of the United States Patent and Trademark Office*